United States Patent [19]
Muller et al.

[11] Patent Number: 6,061,362
[45] Date of Patent: May 9, 2000

[54] INTERFACE FOR A HIGHLY INTEGRATED ETHERNET NETWORK ELEMENT

[75] Inventors: Shimon Muller, Sunnyvale; Curt Berg, Los Altos, both of Calif.

[73] Assignee: Sun Microsystems, Inc., Mountain View, Calif.

[21] Appl. No.: 09/324,875

[22] Filed: Jun. 2, 1999

Related U.S. Application Data

[63] Continuation of application No. 08/884,971, Jun. 30, 1997.

[51] Int. Cl.[7] ..................................................... H04J 3/17
[52] U.S. Cl. ............................. 370/463; 370/446; 370/469
[58] Field of Search .................................. 370/463, 535, 370/446, 469, 503, 419, 420, 421, 466, 425, 465, 445, 438, 439, 407, 434; 395/309

[56] References Cited

U.S. PATENT DOCUMENTS

| | | | |
|---|---|---|---|
| 4,539,637 | 9/1985 | DeBruler | 364/200 |
| 4,627,052 | 12/1986 | Hoare et al. | 370/88 |
| 4,641,302 | 2/1987 | Miller | 370/60 |
| 4,652,874 | 3/1987 | Loyer | 340/825.05 |
| 4,737,953 | 4/1988 | Koch et al. | 370/94 |
| 4,807,111 | 2/1989 | Cohen et al. | 364/200 |
| 4,811,337 | 3/1989 | Hart | 370/85 |
| 4,850,042 | 7/1989 | Petronio et al. | 455/606 |
| 4,899,333 | 2/1990 | Roediger | 370/60 |
| 4,922,503 | 5/1990 | Leone | 370/85.13 |
| 4,933,938 | 6/1990 | Sheehy | 370/85.13 |
| 4,935,869 | 6/1990 | Yamamoto | 364/200 |
| 5,130,977 | 7/1992 | May et al. | 370/60 |
| 5,150,358 | 9/1992 | Punj et al. | 370/84 |
| 5,159,685 | 10/1992 | Kung | 395/575 |
| 5,163,046 | 11/1992 | Hahne et al. | 370/79 |
| 5,210,746 | 5/1993 | Maher et al. | 370/79 |
| 5,220,562 | 6/1993 | Takada et al. | 370/85.13 |
| 5,231,633 | 7/1993 | Hluchyj et al. | 370/94.1 |
| 5,251,205 | 10/1993 | Callon et al. | 370/60 |

(List continued on next page.)

OTHER PUBLICATIONS

International Search Report, PCT/US98/13203, 7 pages.
International Search Report, PCT/US98/13202, 4 pages.
International Search Report, PCT/US98/13368, 5 pages.
International Search Report, PCT/US98/13364, 4 pages.
International Search Report, PCT/US98/13365, 4 pages.
International Search Report, PCT/US98/13177, 4 pages.
International Search Report, PCT/US98/13199, 5 pages.
International Search Report, PCT/US98/13015, 5 pages.
International Search Report, PCT/US98/13016, 4 pages.
Wang et al., "A Novel Message Switch for Highly Parallel Systems", IEEE, pp. 150–155, 1989.
Tobagi, "Fast Packet Switch/ Architectures for Broadband Integrated Services Digital Networks", Proceedings of the IEEE, vol. 78, Issue 1, pp. 133–167, Jan. 1990.
Fliesser et al., "Design of a Multicast ATM Packet Switch, Electrical and Computer Engineering", 1993 Canadian Conference, pp. 779–783, 1993.
Chang et al., "An Overview of the Pipelined Common Buffer Architecture (PCBA) for Memory Based Packet/Cell Switching Systems", Local Computer Networks, 19th Conference IEEE, 1994, pp. 288–297.
Agarwal et al., "A Scalable Shared Buffer ATM Switch Architecture", VLSI, 1995 5th Great Lakes Symposium, IEEE, pp. 256–261, 1994.
Sabaa et al., "Implementation f a Window–Based Scheduler in an ATM Switch", Electrical and Computer Engineering, 1995 Canadian Conference, IEEE, pp. 32–35, 1995.

(List continued on next page.)

*Primary Examiner*—Douglas W. Olms
*Assistant Examiner*—Kenneth Vanderpuye
*Attorney, Agent, or Firm*—Blakely, Sokoloff, Taylor & Zafman

[57] ABSTRACT

The present invention provides a media-independent interface (MII) on a highly integrated network component by implementing the MII interface with a lower pin count, while reducing the timing budget. In another embodiment, the present invention functions to interface MII compatible devices while reducing pin count and the timing budget.

6 Claims, 5 Drawing Sheets

U.S. PATENT DOCUMENTS

| | | | |
|---|---|---|---|
| 5,278,830 | 1/1994 | Kudo | 370/94.1 |
| 5,291,482 | 3/1994 | McHarg et al. | 370/60 |
| 5,293,379 | 3/1994 | Carr | 370/94.1 |
| 5,301,333 | 4/1994 | Lee | 395/725 |
| 5,309,437 | 5/1994 | Perlman et al. | 370/85.13 |
| 5,313,454 | 5/1994 | Bustini et al. | 370/13 |
| 5,343,471 | 8/1994 | Cassagnol | 370/85.13 |
| 5,353,412 | 10/1994 | Douglas et al. | 395/325 |
| 5,365,514 | 11/1994 | Hershey et al. | 370/17 |
| 5,386,413 | 1/1995 | McAuley et al. | 370/54 |
| 5,392,432 | 2/1995 | Engelstad et al. | 395/700 |
| 5,394,402 | 2/1995 | Ross | 370/94.1 |
| 5,396,602 | 3/1995 | Amini et al. | 395/325 |
| 5,402,415 | 3/1995 | Turner | 370/60 |
| 5,404,538 | 4/1995 | Krappweis, Sr. | 395/725 |
| 5,410,540 | 4/1995 | Aiki et al. | 370/60 |
| 5,410,722 | 4/1995 | Cornaby | 395/800 |
| 5,420,862 | 5/1995 | Perlman | 370/85.13 |
| 5,422,838 | 6/1995 | Lin | 365/49 |
| 5,425,026 | 6/1995 | Mori | 370/60 |
| 5,425,028 | 6/1995 | Britton et al. | 370/94.1 |
| 5,426,736 | 6/1995 | Guineau, III | 395/250 |
| 5,432,907 | 7/1995 | Picazo, Jr. et al. | 395/200 |
| 5,450,399 | 9/1995 | Sugita | 370/60.1 |
| 5,455,820 | 10/1995 | Yamada | 370/17 |
| 5,457,681 | 10/1995 | Gaddis et al. | 370/56 |
| 5,459,714 | 10/1995 | Lo et al. | 370/13.1 |
| 5,459,717 | 10/1995 | Mullan et al. | 370/54 |
| 5,461,611 | 10/1995 | Drake, Jr. et al. | 370/54 |
| 5,461,624 | 10/1995 | Mazzola | 370/85.13 |
| 5,473,607 | 12/1995 | Hausman et al. | 370/85.13 |
| 5,477,537 | 12/1995 | Dankert et al. | 370/60 |
| 5,481,540 | 1/1996 | Huang | 370/85.13 |
| 5,485,455 | 1/1996 | Dobbins et al. | 370/60 |
| 5,485,578 | 1/1996 | Sweazey | 395/200.11 |
| 5,490,139 | 2/1996 | Baker et al. | 370/60 |
| 5,490,252 | 2/1996 | Macera et al. | 395/200.01 |
| 5,490,260 | 2/1996 | Miller et al. | 395/427 |
| 5,493,564 | 2/1996 | Mullan | 370/54 |
| 5,500,860 | 3/1996 | Perlman et al. | 370/85.13 |
| 5,509,123 | 4/1996 | Dobbins et al. | 395/200.15 |
| 5,515,376 | 5/1996 | Murthy et al. | 370/85.13 |
| 5,517,488 | 5/1996 | Miyazaki et al. | 370/16 |
| 5,535,202 | 7/1996 | Kondoh | 370/60.1 |
| 5,550,816 | 8/1996 | Hardwick et al. | 370/60 |
| 5,553,067 | 9/1996 | Walker et al. | 370/60 |
| 5,555,405 | 9/1996 | Griesmer et al. | 395/600 |
| 5,557,610 | 9/1996 | Calamvokis et al. | 370/60.1 |
| 5,561,666 | 10/1996 | Christensen et al. | 370/24 |
| 5,561,791 | 10/1996 | Mendelson et al. | 395/550 |
| 5,563,878 | 10/1996 | Blakeley et al. | 370/60 |
| 5,566,170 | 10/1996 | Bakke et al. | 370/60 |
| 5,570,365 | 10/1996 | Yoshida | 370/85.6 |
| 5,572,522 | 11/1996 | Calamvokis et al. | 370/60.1 |
| 5,574,861 | 11/1996 | Lorvig et al. | 395/200.06 |
| 5,583,981 | 12/1996 | Pleyer | 395/326 |
| 5,592,476 | 1/1997 | Calamvokis et al. | 370/390 |
| 5,594,727 | 1/1997 | Kolbenson et al. | 370/442 |
| 5,600,641 | 2/1997 | Duault et al. | 370/400 |
| 5,602,841 | 2/1997 | Lebizay et al. | 370/413 |
| 5,606,669 | 2/1997 | Bertin et al. | 395/200.15 |
| 5,608,726 | 3/1997 | Virgile | 370/401 |
| 5,610,905 | 3/1997 | Murthy et al. | 370/401 |
| 5,615,340 | 3/1997 | Dai et al. | 395/200.17 |
| 5,617,421 | 4/1997 | Chin et al. | 370/402 |
| 5,619,497 | 4/1997 | Gallagher et al. | 370/394 |
| 5,619,500 | 4/1997 | Hiekali | 370/414 |
| 5,619,661 | 4/1997 | Crews et al. | 395/299 |
| 5,623,489 | 4/1997 | Cotton et al. | 370/381 |
| 5,633,710 | 5/1997 | Mandal et al. | 364/514 |
| 5,633,865 | 5/1997 | Short | 370/412 |
| 5,636,371 | 6/1997 | Yu | 395/500 |
| 5,640,605 | 6/1997 | Johnson et al. | 395/881 |
| 5,649,109 | 7/1997 | Griesmer et al. | 395/200.17 |
| 5,651,002 | 7/1997 | Van Seters et al. | 370/392 |
| 5,675,741 | 10/1997 | Aggarwal et al. | 395/200.12 |
| 5,684,800 | 11/1997 | Dobbins et al. | 370/401 |
| 5,689,506 | 11/1997 | Chiussi et al. | 370/388 |
| 5,689,518 | 11/1997 | Galand et al. | 371/37.1 |
| 5,691,984 | 11/1997 | Gardner et al. | 370/401 |
| 5,706,472 | 1/1998 | Ruff et al. | 395/497.04 |
| 5,720,032 | 2/1998 | Picazo, Jr. et al. | 395/200.2 |
| 5,724,348 | 3/1998 | Basso et al. | 370/384 |
| 5,724,358 | 3/1998 | Headrick et al. | 370/418 |
| 5,726,977 | 3/1998 | Lee | 370/235 |
| 5,734,651 | 3/1998 | Blakeley et al. | 370/392 |
| 5,734,865 | 3/1998 | Yu | 395/500 |
| 5,740,171 | 4/1998 | Mazzola et al. | 370/392 |
| 5,740,175 | 4/1998 | Wakeman et al. | 370/422 |
| 5,740,375 | 4/1998 | Dunne et al. | 395/200.68 |
| 5,742,604 | 4/1998 | Edsall et al. | 370/401 |
| 5,742,760 | 4/1998 | Picazo, Jr. et al. | 395/200.02 |
| 5,745,048 | 4/1998 | Taguchi et al. | 340/870.01 |
| 5,748,631 | 5/1998 | Bergantino et al. | 370/398 |
| 5,748,905 | 5/1998 | Hauser et al. | 395/200.79 |
| 5,751,967 | 5/1998 | Raab et al. | 395/200.58 |
| 5,751,971 | 5/1998 | Dobbins et al. | 395/200.68 |
| 5,754,540 | 5/1998 | Liu et al. | 370/315 |
| 5,754,774 | 5/1998 | Bittinger et al. | 395/200.33 |
| 5,754,801 | 5/1998 | Lambrecht et al. | 395/308 |
| 5,757,771 | 5/1998 | Li et al. | 370/235 |
| 5,757,795 | 5/1998 | Schnell | 370/392 |
| 5,761,435 | 6/1998 | Fukuda et al. | 395/200.68 |
| 5,764,634 | 6/1998 | Christensen et al. | 370/389 |
| 5,764,636 | 6/1998 | Edsall et al. | 370/401 |
| 5,781,549 | 7/1998 | Dai | 370/398 |
| 5,784,559 | 7/1998 | Frazier et al. | 395/200.13 |
| 5,784,573 | 7/1998 | Szczepanek et al. | 395/200.8 |
| 5,790,546 | 8/1998 | Dobbins et al. | 370/400 |
| 5,790,808 | 8/1998 | Seaman | 395/200.53 |
| 5,802,047 | 9/1998 | Kinoshita | 370/359 |
| 5,802,052 | 9/1998 | Venkataraman | 370/395 |
| 5,802,278 | 9/1998 | Isfeld et al. | 395/200.02 |
| 5,812,527 | 9/1998 | Kline et al. | 370/232 |
| 5,815,737 | 7/1998 | Buckland | 395/905 |
| 5,822,319 | 10/1998 | Nagami et al. | 370/392 |
| 5,825,767 | 10/1998 | Mizukoshi et al. | 370/395 |
| 5,825,772 | 10/1998 | Dobbins et al. | 370/396 |
| 5,835,491 | 11/1998 | Davis et al. | 370/386 |
| 5,838,677 | 11/1998 | Kozaki et al. | 370/389 |
| 5,838,681 | 11/1998 | Bonomi et al. | 370/395 |
| 5,852,607 | 12/1998 | Chin | 370/401 |
| 5,856,977 | 1/1999 | Yang et al. | 370/411 |
| 5,859,849 | 1/1999 | Parks | 370/395 |
| 5,867,677 | 2/1999 | Tsukamoto | 395/311 |
| 5,872,783 | 2/1999 | Chin | 370/392 |
| 5,872,904 | 2/1999 | McMillen et al. | 395/182.02 |
| 5,875,464 | 2/1999 | Kirk | 711/129 |
| 5,878,043 | 3/1999 | Casey | 370/397 |
| 5,878,232 | 3/1999 | Marimuthu | 395/200.79 |
| 5,892,912 | 4/1999 | Suzuki et al. | 395/200.48 |
| 5,892,926 | 4/1999 | Witkowski et al. | 370/278 |
| 5,898,687 | 4/1999 | Harriman et al. | 370/390 |
| 5,903,616 | 5/1999 | Rangan et al. | 375/354 |
| 5,931,980 | 11/1998 | Varma et al. | 370/395 |
| 5,953,345 | 8/1999 | Findlater et al. | 370/446 |

OTHER PUBLICATIONS

International Search Report, PCT/US98/13361, 5 pages.
International Search Report, PCT/US98/13200, 6 pages.
International Search Report, PCT/US98/13362, 5 pages.

International Search Report, PCT/US98/13206, 8 pages.

Naraghi–Pour et al., "A Multiple Shared Memory Switch", System Theory, 1996 Southeastern Symposium, IEEE, pp. 50–54, 1996.

Iyengar et al, "Switching Prioritized Packets", GLOBECOM '89, IEEE Global Telecommunications Conference, pp. 1181–1186, 1989.

"Foundry Products", downloaded from Website http://www.foundrynet.com on Jun. 19, 1997.

Anthony J. McAuley & Paul Francis, "Fast Routing Table Lookup Using CAMs", IEEE, pp. 1382–1390, 1993.

"Gigabit Ethernet", Network Strategy Report, The Burton Group, v2, 40 pages, May 8, 1997.

Erica Roberts, "IP on Speed", Internet Draft, Data Communications on the Web, 12 pages, Mar., 1997.

"Multilayer Topoloy", White Paper, Internet Draft, download from Website http://www.baynetworks.com on Apr. 18, 1997, 13 pages.

Load Balancing for Multiple Interfaces for Transmission Control Protocol/Internet Protocol for VM/MVS, IBM Technical Disclosure Bulletin, 38(9): 7–9 (Sep., 1995).

T. Nishizono et al., "Analysis on a Multilink Packet Transmission System", Electron.Commun.JPN 1, Commun., (USA), 68(9):98–104 (Sep., 1985).

International Search Report, PCT/US 98/13380.

FIG. 3b Multiplexed MII:

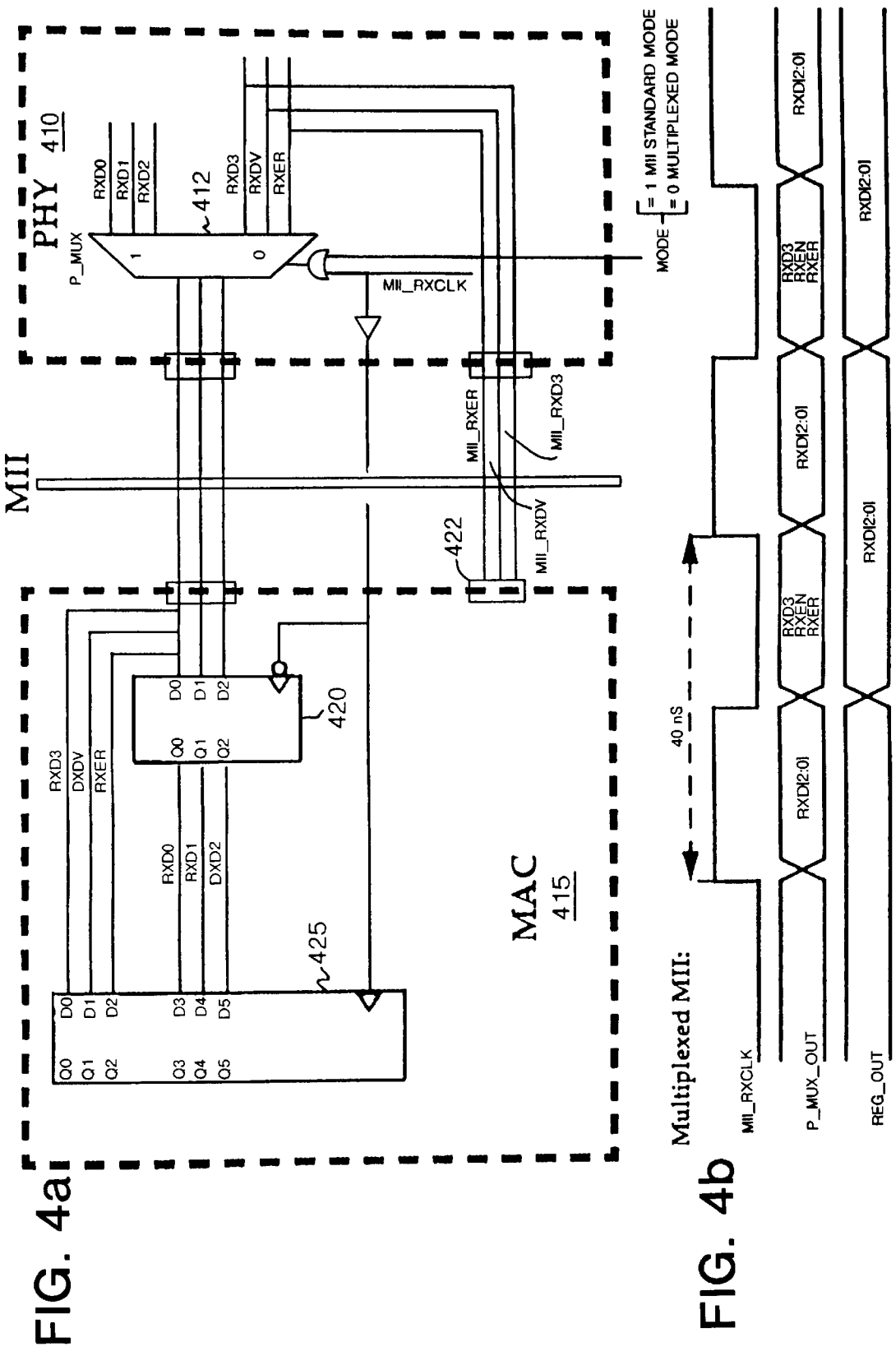

INTERFACE FOR A HIGHLY INTEGRATED ETHERNET NETWORK ELEMENT

This is a continuation of application Ser. No. 08/884,971, filed on Jun. 30, 1997, that is currently pending.

BACKGROUND OF THE INVENTION

1. Field of the Invention

The present invention relates to an improved data communications interface. More particularly, the system and method of the present invention relates to an improved media-independent interface for interconnection between the physical layer components and media access controllers.

2. Art Background

The Institute of Electrical and Electronic Engineers (IEEE) working standard 802.3u (1995) defines a media-independent interface (MII) for interoperable interconnection between the physical layer components (PHYs) and media access controllers (MACs) in IEEE 802.3 compatible network devices. The MII provides for a total of eighteen interconnect signals and a generous timing budget that allows for relatively straightforward implementation of the MII in numerous devices. In the context of implementing a highly integrated ethernet network element (e.g, switch or repeater), one of the major concerns that has to be addressed by the implementors is the ability to achieve the desired port density in the network element. Frequently, this aspect of the design is constrained by the required pin count of the integrated circuit (IC).

Due to significant advances in silicon technology in recent years, the generous timing budgets provided by the IEEE 802.3u standard is no longer needed to achieve a cost-effective network device implementation. Therefore, it is desirable to optimize the MII definition to decrease the pin count per connection, while still operating in an economic timing budget. This is particularly useful in a highly integrated ethernet network element which includes a multiplicity of ports.

SUMMARY OF THE INVENTION

The present invention provides a media-independent interface (MII) on a highly integrated network component by implementing the MII interface with a lower pin count, while reducing the timing budget. In another embodiment, the present invention functions to interface to MII compatible devices while reducing pin count and the timing budget.

In one embodiment, certain signals that require significant access or are time critical are singularly transmitted as was done in compliance with the IEEE 802.3 standard, while other signals that are not as time-critical are multiplexed using the different portions of the clock signal to transmit different signals. In particular, the datapath signals are grouped into two groups: the receive group and transmit group. Within each group, clock phase multiplexing is performed wherein half of the signals are driven during a first phase, e.g., the high phase of the clock and the other half is driven during a second phase, e.g., the low phase of the clock. On the send side of the interconnect, the signal multiplexing is performed, while on the receive side of the interconnect, de-multiplexing is performed. Thus, a highly efficient and cost-effective port density is achieved in an integrated ethernet network element, such as switches and repeaters.

BRIEF DESCRIPTION OF THE DRAWINGS

The objects, features and advantages of the present invention will be apparent to one skilled in the art in light of the foregoing description in which:

FIG. 3b is a timing diagram illustrating the relative timing of the circuit of FIG. 3a.

FIG. 4a illustrates the receive multiplexing circuitry in accordance with the teachings of the present invention.

FIG. 4b is a timing diagram illustrating the relative timing of the circuit of FIG. 4a.

DETAILED DESCRIPTION

In the following description for purposes of explanation, numerous details are set forth in order to provide a thorough understanding of the present invention. However, it will be apparent to one skilled in the art these specific details are not required in order to practice the present invention. In other instances, well-known electrical structures and circuits are shown in block diagram form in order not to obscure the present invention unnecessarily.

Figure 1:
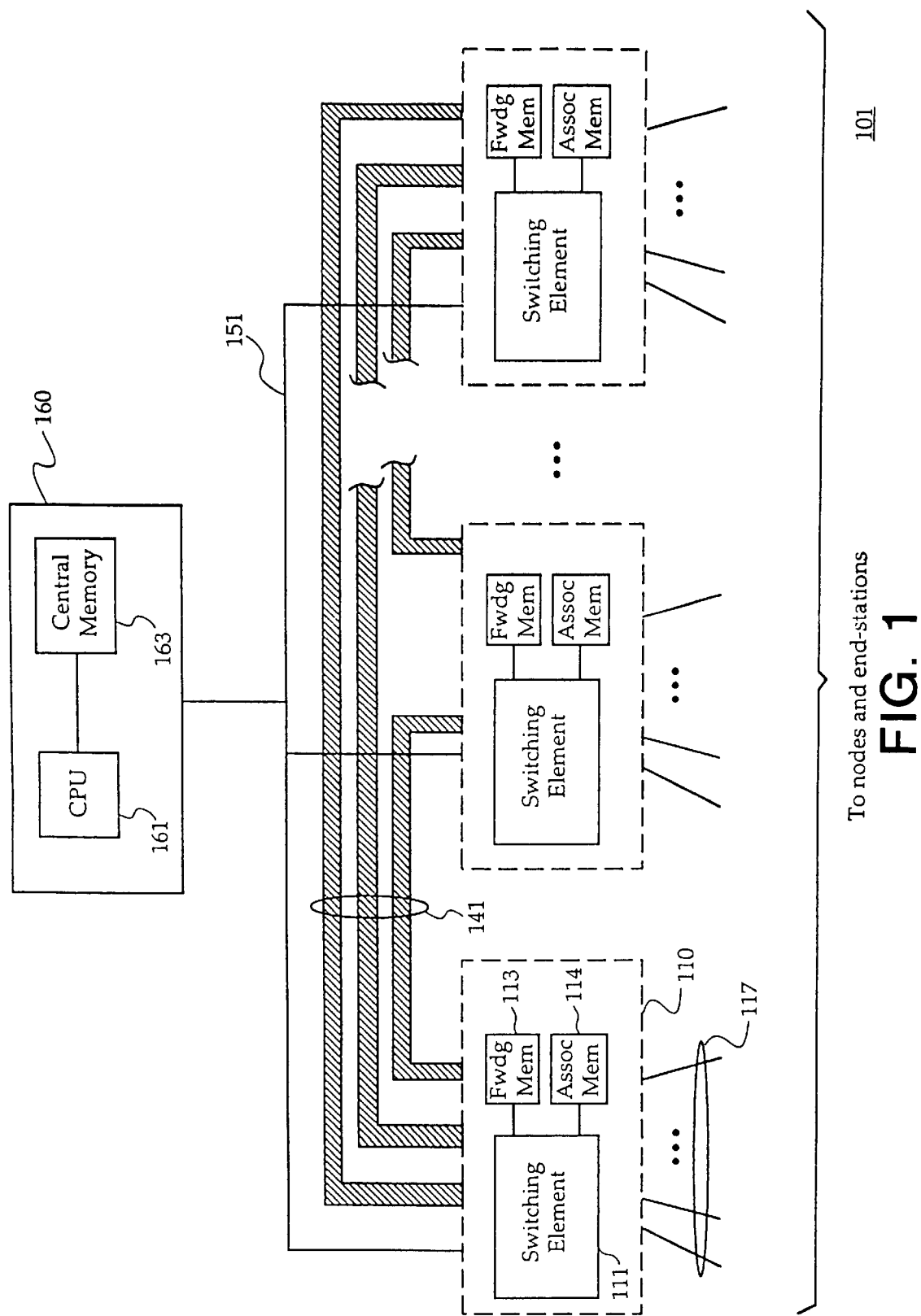
FIG. 1 illustrates a network device.

The interface of the present invention is described in the context of a network switch. However, it is readily apparent that the present invention is applicable to other network elements. An exemplary network element is shown in FIG. 1.

The network element is used to interconnect a number of nodes and end-stations in a variety of different ways. For example, an application of the multi-layer distributed network element (MLDNE) would be to route packets according to predefined routing protocols over a homogenous data link layer such as the IEEE 802.3 standard, also known as the Ethernet. Other routing protocols can also be used.

The MLDNE's distributed architecture can be configured to route message traffic in accordance with a number of known or future routing algorithms. In a preferred embodiment, the MLDNE is configured to handle message traffic using the Internet suite of protocols, and more specifically the Transmission Control Protocol (TCP) and the Internet Protocol (IP) over the Ethernet LAN standard and medium access control (MAC) data link layer. The TCP is also referred to here as a Layer 4 protocol, while the IP is referred to repeatedly as a Layer 3 protocol.

In one embodiment of the MLDNE, a network element is configured to implement packet routing functions in a distributed manner, i.e., different parts of a function are performed by different subsystems in the MLDNE, while the final result of the functions remains transparent to the external nodes and end-stations. As will be appreciated from the discussion below and the diagram in FIG. 1, the MLDNE has a scalable architecture which allows the designer to predictably increase the number of external connections by adding additional subsystems, thereby allowing greater flexibility in defining the MLDNE as a stand alone router.

As illustrated in block diagram form in FIG. 1, the MLDNE 101 contains a number of subsystems 110 that are fully meshed and interconnected using a number of internal links 141 to create a larger switch.

At least one internal link couples any two subsystems. Each subsystem 110 includes a switch element 111 coupled to a forwarding memory 113 and an associated memory 114. The forwarding memory (or database) 113 stores an address table used for matching with the headers of received packets. The associated memory (or database) stores data associated with each entry in the forwarding memory that is used to identify forwarding attributes for forwarding the packets through the MLDNE. A number of external ports (not shown) having input and output capability interface the external connections 117. In one embodiment, each subsystem supports multiple Gigabit Ethernet ports, Fast Ethernet ports and Ethernet ports. Internal ports (not shown) also having input and output capability in each subsystem couple the internal links 141. Using the internal links, the MLDNE can connect multiple switching elements together to form a multigigabit switch.

The MLDNE 101 further includes a central processing system (CPS) 160 that is coupled to the individual subsystem 110 through a communication bus 151 such as the peripheral components interconnect (PCI). The CPS 160 includes a central processing unit (CPU) 161 coupled to a central memory 163. Central memory 163 includes a copy of the entries contained in the individual forwarding memories 113 of the various subsystems. The CPS has a direct control and communication interface to each subsystem 110 and provides some centralized communication and control between switch elements.

Figure 2:
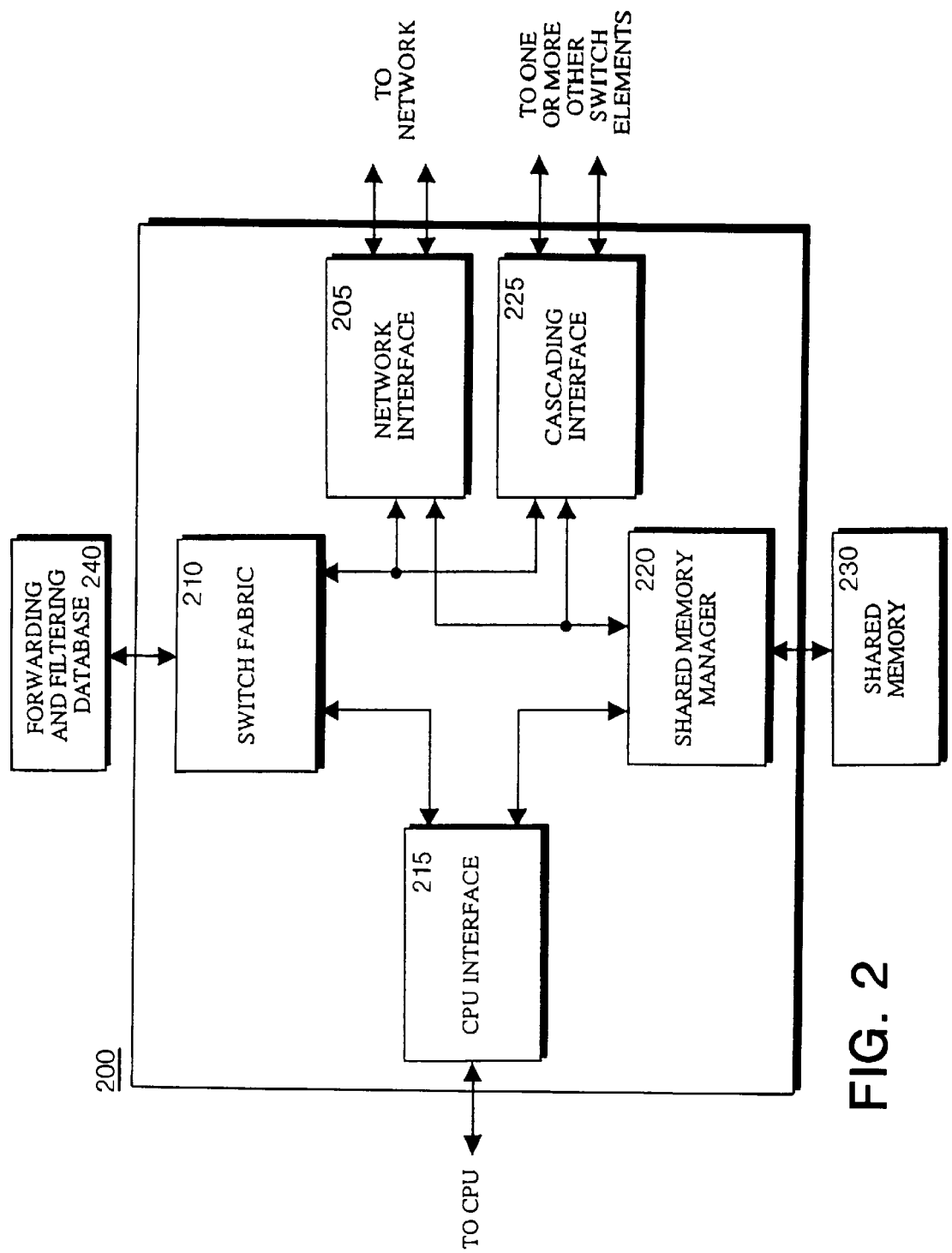
FIG. 2 illustrates a network component implemented in the network device of FIG. 1.

FIG. 2 is a simplified block diagram illustrating an exemplary architecture of the switch element of FIG. 1. The switch element 200 depicted includes a central processing unit (CPU) interface 215, a switch fabric block 210, a network interface 205, a cascading interface 225, and a shared memory manager 220.

Ethernet packets may enter or leave the network switch element 200 through any one of the three interfaces 205, 215, or 225. In brief, the network interface 205 operates in accordance with corresponding Ethernet protocol to receive Ethernet packets from a network (not shown) and to transmit Ethernet packets onto the network via one or more external ports (not shown). An optional cascading interface 225 may include one or more internal links (not shown) for interconnecting switching elements to create larger switches. For example, each switch element may be connected together with other switch elements in a full mesh topology to form a multi-layer switch as described above. Alternatively, a switch may comprise a single switch element 200 with or without the cascading interface 225.

The CPU (not shown) may transmit commands or packets to the network switch element 200 via the CPU interface 215. In this manner, one or more software processes running on the CPU may manage entries in an external forwarding and filtering database 240, such as adding new entries and invalidating unwanted entries. In alternative embodiments, however, the CPU may be provided with direct access to the forwarding and filtering database. In any event, for purposes of packet forwarding, the CPU port of the CPU interface 215 resembles a generic input port into the switch element 200 and may be treated as if it were simply another external network interface port. However, since access to the CPU port occurs over a bus such as a peripheral components interconnect (PCI) bus, the CPU port does not need any media access control (MAC) functionality.

Returning to the network interface 205, the two main tasks of input packet processing and output packet processing will now briefly be described. Input packet processing may be performed by one or more input ports of the network interface 205. Input packet processing includes the following: (1) receiving and verifying incoming Ethernet packets, (2) modifying packet headers when appropriate, (3) requesting buffer pointers from the shared memory manager 220 for storage of incoming packets, (4) requesting forwarding decisions from the switch fabric block 210, (5) transferring the incoming packet data to the shared memory manager 220 for temporary storage in an external shared memory 230, and (5) upon receipt of a forwarding decision, forwarding the buffer pointer(s) to the output port(s) indicated by the forwarding decision. Output packet processing may be performed by one or more output ports of the network interface 205. Output processing includes requesting packet data from the shared memory manager 220, transmitting packets onto the network, and requesting deallocation of buffer(s) after packets have been transmitted.

The network interface 205, the CPU interface 215, and the cascading interface 225 are coupled to the shared memory manager 220 and the switch fabric block 210. Preferably, critical functions such as packet forwarding and packet buffering are centralized as shown in FIG. 2. The shared memory manager 220 provides an efficient centralized interface to the external shared memory for buffering of incoming packets. The switch fabric block 210 includes a search engine and learning logic for searching and maintaining the forwarding and filtering database with the assistance of the CPU.

The centralized switch fabric block 210 includes a search engine that provides access to the forwarding and filtering database on behalf of the interfaces 205, 215, and 225. Packet header matching, Layer 2 based learning, Layer 2 and Layer 3 packet forwarding, filtering, and aging are exemplary functions that may be performed by the switch fabric block 210. Each input port is coupled with the switch fabric block 210 to receive forwarding decisions for received packets. The forwarding decision indicates the outbound port(s) (e.g., external network port or internal cascading port) upon which the corresponding packet should be transmitted. Additional information may also be included in the forwarding decision to support hardware routing such as a new MAC destination address (DA) for MAC DA replacement. Further, a priority indication may also be included in the forwarding decision to facilitate prioritization of packet traffic through the switch element 200.

In the present embodiment, Ethernet packets are centrally buffered and managed by the shared memory manager 220. The shared memory manager 220 interfaces every input port and output port and performs dynamic memory allocation and deallocation on their behalf, respectively. During input packet processing, one or more buffers are allocated in the external shared memory and an incoming packet is stored by the shared memory manager 220 responsive to commands received from the network interface 205, for example. Subsequently, during output packet processing, the shared memory manager 220 retrieves the packet from the external shared memory and deallocates buffers that are no longer in use. To assure no buffers are released until all output ports have completed transmission of the data stored therein, the shared memory manager 220 preferably also tracks buffer ownership.

The interface of the present invention is particularly advantageous to manufacturers of switches and hubs which incorporate multiple MII ports into one ASIC. The MIH port interfaces MAC circuitry to a physical layer device. In implementation, the port and the circuitry described herein may reside on the same component or distributed across several components. For example, in the embodiment described herein, the interface is located within the network interface. Following the teachings described herein, one implementation requires the addition of minimal logic, while realizing a 37% savings with respect to the pin count, and maintaining compatibility with the existing standard. In particular, in the embodiment described herein, each port can operate using ten signal pins instead of the sixteen originally specified by IEEE standard 802.3.

Multiplexing is achieved by sending three bits of information during a first phase of the transmit clock, and three bits during a second phase of the transmit clock using a multiplexer in the media-access controller (MAC), and a three bit register and multiplexer in the physical layer component (PHY). In particular, the datapath signals (e.g., data control and clock signals) are grouped into two groups: receive group and transmit group. Within each group, clock phase multiplexing is performed on the datapath signals wherein half of the signals are driven during a first phase of the corresponding clock, and the other half is driven during the a second phase of the same clock. In the present embodiment, the first phase is the high phase of the clock and the second phase is the low phase of the clock; however, other variations also are contemplated. The sending side of the interconnect forms the signal multiplexing, and the receiving side of the interconnect performs the signal de-multiplexing. In order to maintain the efficiency of operation, certain control signals remain un-multiplexed for consistent availability and access whenever needed.

In the present embodiment, the control signals include a carrier sense signal (CRS), collision detected (COL), management data clock (MDC) and management data input/output (MDIO). The CRS is asserted by the physical implementation layer (PHY) when either the transmit or receive medium is not idle. The CRS is deasserted by the PHY when both the transmit and receive media are idle. The COL signal is asserted by the PHY upon detection of a collision on the medium and remains asserted while the collision condition persists. The MDC signal is a periodic signal sourced by a station management entity (STA) such as the CPU (161, FIG. 1) and sent to the PHY as the timing reference for transfer of information on the MDIO signal. The MDIO signal is a bidirectional signal between the PHY and the STA. Control information is driven by the STA synchronously with respect to MDC and is sampled synchronously by the PHY. Status information is driven by the PHY synchronously with respect to the MDC signal and is sampled synchronously by the STA.

It is therefore desirable to transmit the CRS, COL, MDC and MDIO on separate signal lines as the CRS and COL should always be accessible by the MAC or STA component and the MDC and MDIO should be independent of other signals in order to properly control the components and receive status information. Furthermore, none of the above signals have a required predefined timing relationship to the timing signals provided at the MII (e.g., receive clock and transmit clock).

However, the signals particularly relevant to transmission and reception of data can be multiplexed as the timing relationship among the signals is well defined and very little logic is needed to multiplex and demultiplex the signals. In the present embodiment the following signals operate synchronous to the transmit clock (MII_TXCLK): transmit data TXD[3:0], transmit enable (TX_EN), transmit coding error (TX_ER). The transmit clock is a continuous clock that provides the timing reference for the transfer of the TX_EN, TXD and TX_ER signals to the PHY. Preferably the MII_TXCLK is sourced by the PHY. The TXD bits are driven to the PHY and transition synchronously with respect to the MII_TXCLK. The TX_EN signals indicates that the data is available for transmission on the MII. It is asserted with the first available nibble of data and remains asserted while all nibbles are transmitted and is deasserted on the first MII_TXCLK following the last nibble of the frame of data. TX_EN transitions synchronously with the MII_TXCLK. The TX_ER signal, which also transitions synchronously with respect to the MII_TXCLK, is asserted for one or more MII_TXCLK periods while TX_EN is also asserted when an error occurs.

The following signals operate synchronous to the receive clock: Receive data (RXD[3:0]), receive data valid (RX_DV) and receive error (RX_ER). The MII_RXCLK is a continuous clock signal that provides the timing reference for the transfer of the RX_DV, RXD and RX_ER signals from the PHY. MII_RXCLK is sourced by the PHY. The PHY may recover the MII_RXCLK reference from the received data or it may derive the MII_RXCLK reference from a nominal clock (e.g, the MII_TXCLK). The RXD transitions synchronously with the MII_RXCLK and is driven by the PHY. The RX_DV signal is driven by the PHY to indicate that the PHY is presenting recovered and decoded nibbles on the RXD lines and that the data is synchronous to MII_RXCLK. RX_DV transitions synchronously with respect to the MII_RXCLK and remains asserted continuously from the first recovered nibble of the frame through the final recovered nibble and shall be deasserted prior to the first MII_RXCLK that follows the final nibble of the frame (excluding the end of frame delimiter). The RX_ER is driven synchronous to the MII_RXCLK by the PHY and is asserted for one or more MII_RXCLK periods to indicate an error (e.g., coding error or an error that is undetectable by the MAC but detectable by the PHY) was detected in the frame presently being transferred from the PHY.

Although the signals can be multiplexed in a variety of ways, it is preferred that the following signals are multiplexed as follows:

TXD0/TXD3
TXD1/TX_EN
TXD2/TX ER
RXD0/RXD3
RXD1/RX_DV
RXD2/RX_ER

It has been determined that the latency incurred implementing this scheme is far outweighed by the reduction in the number of signal lines required between the MAC and the PHY. This is particularly the case when configured in a high port density network element.

Figure 3A:
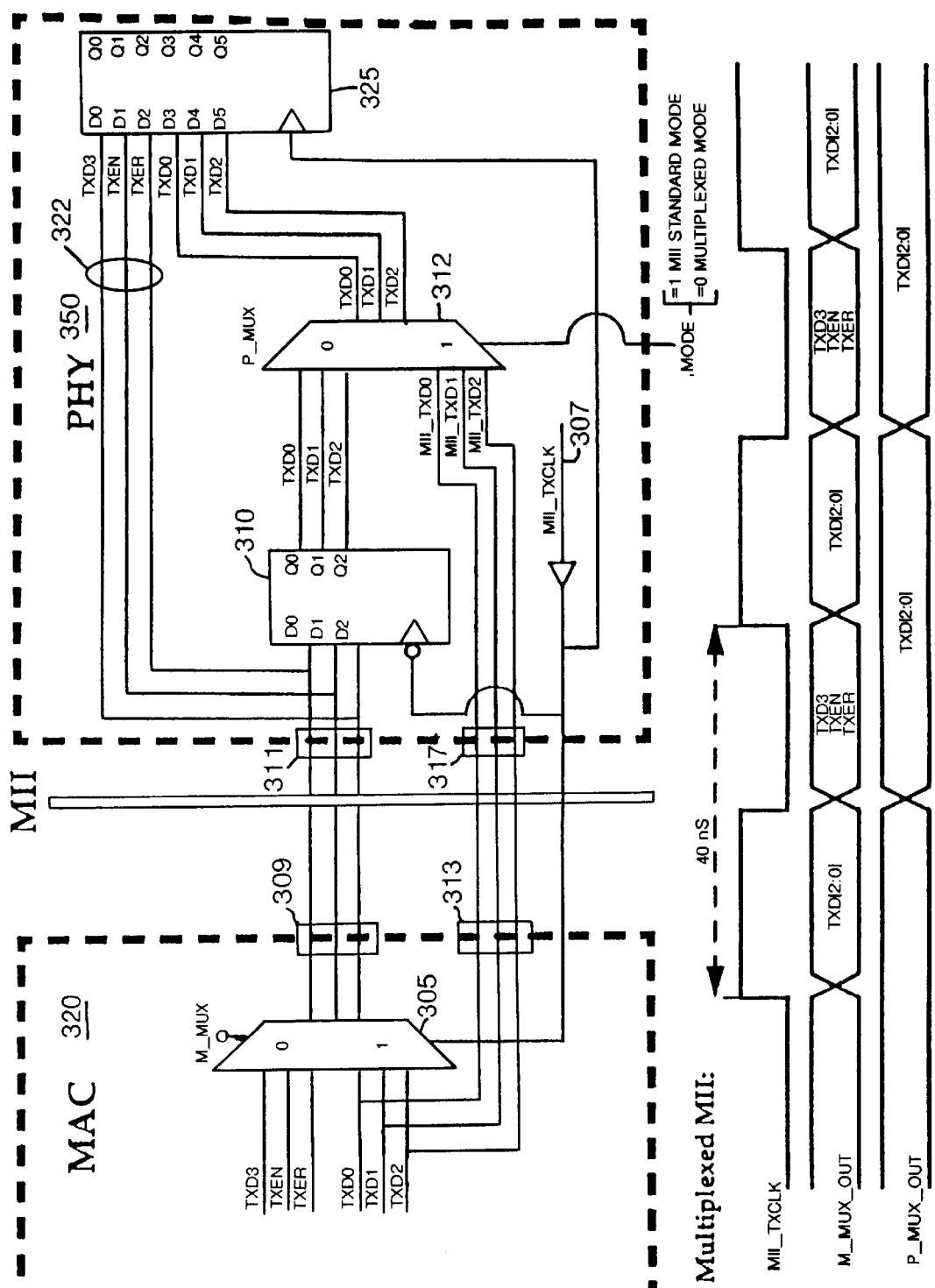
FIG. 3a illustrates the transmit multiplexing circuitry in accordance with the teachings of the present invention.

The circuitry for transmit multiplexing is shown in the embodiment illustrated in FIG. 3*a*. Furthermore, circuitry to selectively use this feature is disclosed. Other embodiments are also contemplated. Thus, in this embodiment, the circuitry permits the standard mode or multiplex mode to be selected such that the device is configurable for connection to other standard or multiplexed connecting device. In particular, the transmit datapath signals are output through multiplexer 305, which is active based on the clock input MII_TX clock 307 to output 309. The clock 307 also drives the input flip-flop/register 310, such that the incoming data through input 311 is timely clocked to the P_MUX 312.

When operating in the standard mode, the P_MUX 312 outputs the TXD0, TXD1 and TXD2 signals from the MAC 320 through output 313 and received over the MII bus lines through input 317 to register 325. Signals TXD3, TX_EN and TX_ER are therefore communicated through input 311 and lines 322 to register 325.

When operable in the multiplexing mode, during one phase of the clock (MIR_TXCLK 307), the TXD0, TXD1 and TXD2 are output by M_MUX 305 through output 309 and received through input 311 by flip-flop 310. These signals are then processed through P_MUX multiplexer 312 and output to register 325 during the next clock phase when the signals TXD3, TX_EN and TX_ER are communicated through M_MUX 305 and output 309. These signals are communicated across the interface to input 311 and register 325 via lines 322. At the same time, signals TXD0, TXD1 and TXD2 are available at register 325 to concurrently provide all six signals for compatibility with the MII device. The timing is illustrated in FIG. 3b, which shows that the output of the multiplexer in the MAC 320 element is output followed by the output of TXD3, TX_EN and TX_ER during the next low phase of MIITX_CLK.

It should be noted that the output of the P_MUX 312 in PHY 350 enables the TXD0, TXD1 and TXD2 signals to be available during both the high phase and the low phase of the clock as selected by the mode.

FIG. 4a illustrates the interface circuitry for signals transmitted in the receive direction. In the receive direction, six signals are sent over three signal lines, three during the high phase of the clock and three during the low phase of the clock. In the PHY element 410, a three bit MUX, P_MUX, 412 is used to implement the multiplex mode. In the MAC element 415, there is an additional three bit flip-flop/register 420 to receive three bits during the low phase of the clock and a register 425 to receive all six signals for output compatibility with MII. As with the transmit circuitry, when operating in the MII standard mode, the circuitry operates in accordance with the IEEE 802.3 standard. For purposes of simplification of discussion, the circuitry to support both modes is not illustrated in detail in MAC 415; however, circuitry similar to that shown in PHY 350 (FIG. 3a) would be used and would have the additional receive bits RXER, RXDV and RXD3 transmitted directly to the MAC 415 through an additional group of lines (e.g., 422) and add a multiplexor to select, based upon the mode, between RXD3, RXDV, RXER and MII_RXER, MII_RXDV and MII_RXD3.

As shown in FIG. 4a, when operating in multiplex mode, signals RXD3, RX_DV and RX_ER signals are output through the P_MUX 412 during the low phase of the clock and RXD0, RXD1 and RXD2 are output during the high phase of the clock. Flip-flop 420 is used to clock signals RXD0, RXD1 and RXD2 such that they are received concurrently at the register 425 with signals RXD3, RXDV and RXDR. The timing for this is illustrated in FIG. 4b.

Figures 5A, 5B:
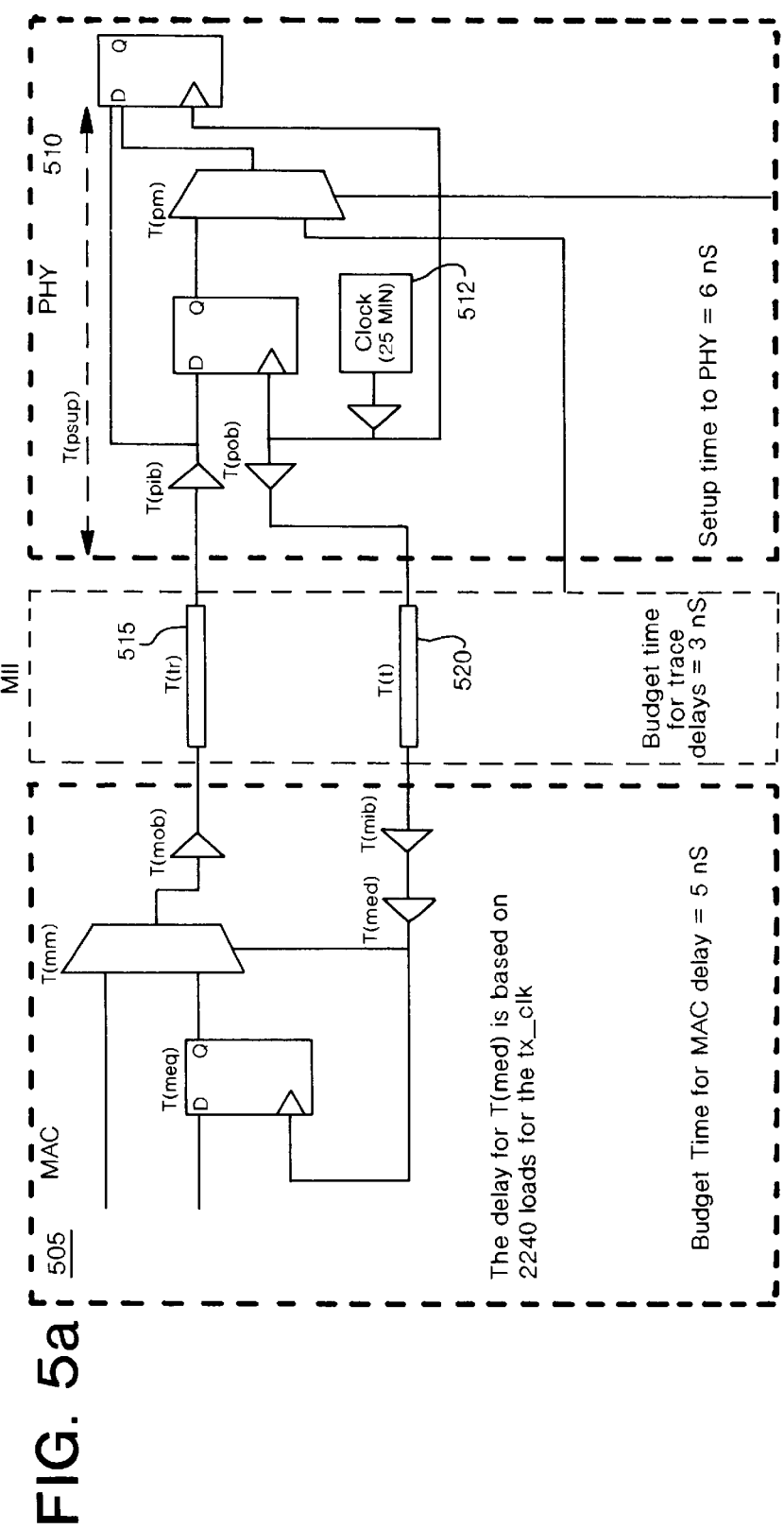
FIG. 5a is a diagram that illustrates the timing budget.
FIG. 5b is a table of the timing budget.

The circuitry described enables the transmission to occur within current timing budgets. Referring to FIG. 5a, the transmit timing is critical as the MAC transmit circuit 505 relies on the transmit clock 512 that is generated by PHY 510. Therefore, when determining the timing budget, the delays from the PHY 510, through external trace 520 to the MAC 505 and the trace 515 going back to the PHY 510, plus the setup time required at the input of the PHY 510 must be considered.

Continuing reference to FIG. 5a, the timing delays incurred are illustrated. Since the clock's duty cycle is approximately a 2:3 ratio (e.g., 35% high and 65% low of the 40 nanosecond transmit clock), as specified in the IEEE 802.3 standard, there are only 14 nanoseconds to multiplex the first group of signals and 26 nanoseconds to MUX the second group of signals.

Thus, the following must be satisfied:

$$T(pob)+T(mib)+T(mcd)+T(mcq)+T(mm)+T(mob))\times 1.395+2 \times T(tr)+T(psup)<14 \text{ nS}$$

Using as an example specifications from the LSI G10 Cell-Based ASIC Product Databook (LSI Logic, Inc.), propagation delay timing for the circuit is determined:

$$(0.28 \text{ nS}+0.31 \text{ nS}+0.82 \text{ nS}+0.44 \text{ nS}+0.55 \text{ nS}+0.28 \text{ nS})\times 1.395+2\times 1.5 \text{ nS}+T(psup)<14 \text{ nS}$$

$$3.73+3 \text{ nS}+T(psup)<14 \text{ nS}$$

$$6.73+T(psup)<14 \text{ nS}$$

Preferably the timing budget therefore allocated is that shown in the table of FIG. 5b. The receive timing is not critical as the transmit path of both the data and the clock are sourced from PHY. Therefore, the loop timing constraints that occur in the transmit case do not appear and there are sufficient margins to perform the receive functions.

The invention has been described in conjunction with the preferred embodiment. It is evident that numerous alternatives, modifications, variations and uses will be apparent to those skilled in the art in light of the foregoing description.

What is claimed is:

1. A method of communicating Institute of Electrical and Electronic Engineers (IEEE) standard 802.3u media independent interface (MII) signals between a media access control (MAC) and a physical layer (PHY) to allow decreased pin count per connection, the method comprising the steps of:

in a multiplexed mode, transferring a first subset of MII datapath signals from the MAC to the PHY through a first group of ports during a first interval of time and transferring a second subset of MII datapath signals from the MAC to the PHY through the first group of ports during a second interval of time by performing clock phase multiplexing; and in a MII standard mode, transferring the MII datapath signals from the MAC to the PHY through the first group of ports and a second group of ports during the same interval of time.

2. The method of claim 1, wherein the first subset of MII datapath signals includes TXD0, TXD1, TXD2 and the second subset of MII datapath signals includes TXD3, TX_EN, and TX_ER.

3. The method of claim 2, wherein the first interval of time represents a first phase of a clock and the second interval of time represents a second phase of the clock.

4. A method of communicating Institute of Electrical and Electronic Engineers (IEEE) standard 802.3u media independent interface (MII) signals between a media access control (MAC) and a physical layer (PHY) to allow decreased pin count per connection, the method comprising the steps of:

in a multiplexed mode, transferring a first subset of MII datapath signals from the PHY to the MAC through a first group of ports during a first interval of time and transferring a second subset of MII datapath signals from the PHY to the MAC through the first group of ports during a second interval of time by performing clock phase multiplexing; and in a MII standard mode, transferring the MII datapath signals from the PHY to the MAC through the first group of ports and a second group of ports during the same interval of time.

5. The method of claim 4, wherein the first subset of MII datapath signals includes RXD0, RXD1, RXD2 and the second subset of MII datapath signals includes RXD3, RX_DV, and RX_ER.

6. The method of claim 5, wherein the first interval of time represents a first phase of a clock and the second interval of time represents a second phase of the clock.

* * * * *